US010832543B2

(12) United States Patent
Cheng et al.

(10) Patent No.: US 10,832,543 B2
(45) Date of Patent: Nov. 10, 2020

(54) ACTIVITY SENSOR

(71) Applicant: The Chamberlain Group, Inc., Oak Brook, IL (US)

(72) Inventors: Fred Cheng, Los Altos Hills, CA (US); Herman Yau, Sunnyvale, CA (US)

(73) Assignee: The Chamberlain Group, Inc., Oak Brooks, IL (US)

(*) Notice: Subject to any disclaimer, the term of this patent is extended or adjusted under 35 U.S.C. 154(b) by 0 days.

(21) Appl. No.: 16/246,368

(22) Filed: Jan. 11, 2019

(65) Prior Publication Data

US 2020/0226897 A1 Jul. 16, 2020

(51) Int. Cl.

| | |
|---|---|
| ***G08B 13/196*** | (2006.01) |
| ***G02B 27/00*** | (2006.01) |
| ***G08B 27/00*** | (2006.01) |
| ***G08B 13/19*** | (2006.01) |

(52) U.S. Cl.

CPC ....... *G08B 13/19695* (2013.01); *G08B 13/19* (2013.01); *G08B 13/19684* (2013.01); *G08B 27/005* (2013.01)

(58) Field of Classification Search

CPC ............ G08B 13/19695; G08B 27/005; G08B 13/19684; G08B 13/19

See application file for complete search history.

(56) References Cited

U.S. PATENT DOCUMENTS

| | | | | |
|---|---|---|---|---|
| 6,735,387 | B1 | 5/2004 | Schnell | |
| 6,768,868 | B1 | 7/2004 | Schnell | |
| 6,834,162 | B1 | 12/2004 | Schnell | |
| 7,149,422 | B2 | 12/2006 | Schnell | |
| 7,193,644 | B2 | 3/2007 | Carter | |
| 7,308,196 | B2 | 12/2007 | Schnell | |
| 7,593,632 | B2 | 9/2009 | Schnell | |
| 7,710,457 | B2 | 5/2010 | Schnell | |
| 7,873,266 | B2 | 1/2011 | Schnell | |
| 8,139,098 | B2 | 3/2012 | Carter | |
| 8,144,183 | B2 | 3/2012 | Carter | |
| 8,144,184 | B2 | 3/2012 | Carter | |
| 8,154,581 | B2 | 4/2012 | Carter | |
| 8,164,614 | B2 | 4/2012 | Carter | |
| 8,254,776 | B2 | 8/2012 | Schnell | |
| 8,350,915 | B2 | 1/2013 | Schnell | |
| 8,410,930 | B2 | 4/2013 | Karasek | |
| 8,895,926 | B2 | 11/2014 | Schnell | |
| 9,176,608 | B1 * | 11/2015 | Baldwin | G09G 5/00 |
| 9,390,032 | B1 * | 7/2016 | Baldwin | H04N 5/232 |

(Continued)

OTHER PUBLICATIONS

Ismail Cervik, et al., An Ultra-Low Power CMOS Image Sensor with On-Chip Energy Harvesting and Power Management Capability, Sensors 2015, 15, 5531-5554; doi:10.3390/s150305531, ISSN 1424-8220, Mar. 2015.

(Continued)

*Primary Examiner* — Ryan W Sherwin

(74) *Attorney, Agent, or Firm* — Fitch Even Tabin & Flannery LLP

(57) ABSTRACT

An activity sensor system includes a library that stores image information. A low power artificial intelligence based image sensor captures images from a first location at a first image resolution. The sensor has access to the library that stores image information. The sensor is able to recognize images based on the image information in the image library.

15 Claims, 3 Drawing Sheets

(56) References Cited

U.S. PATENT DOCUMENTS

| | | | |
|---|---|---|---|
| 9,414,030 | B2 | 8/2016 | Carter |
| 9,432,638 | B2 | 8/2016 | Carter |
| 9,485,478 | B2 | 11/2016 | Carter |
| 9,516,284 | B2 | 12/2016 | Carter |
| 9,554,090 | B1 | 1/2017 | Carter |
| 9,635,323 | B2 | 4/2017 | Carter |
| 9,648,290 | B2 | 5/2017 | Carter |
| 9,683,391 | B2 | 6/2017 | Johnson |
| 9,706,178 | B2 | 7/2017 | Carter |
| 9,756,233 | B2 | 9/2017 | Lee |
| 9,866,802 | B2 | 1/2018 | Carter |
| 9,924,141 | B2 | 3/2018 | Carter |
| 10,097,796 | B2 | 10/2018 | Carter |
| 10,097,797 | B2 | 10/2018 | Carter |
| 10,200,660 | B2 | 2/2019 | Carter |
| 10,523,906 | B2 | 12/2019 | Carter |
| 2005/0285934 | A1 | 12/2005 | Carter |
| 2007/0103541 | A1 | 5/2007 | Carter |
| 2007/0103542 | A1 | 5/2007 | Carter |
| 2007/0103548 | A1 | 5/2007 | Carter |
| 2008/0117299 | A1 | 5/2008 | Carter |
| 2008/0136908 | A1 | 6/2008 | Carter |
| 2009/0278912 | A1 | 11/2009 | Carter |
| 2009/0284578 | A1 | 11/2009 | Carter |
| 2009/0284595 | A1 | 11/2009 | Carter |
| 2013/0201360 | A1 * | 8/2013 | Song .................. H04N 5/23241 348/222.1 |
| 2015/0222852 | A1 | 8/2015 | Carter |
| 2015/0312534 | A1 | 10/2015 | Carter |
| 2016/0093180 | A1 | 3/2016 | Fitzgibbon |
| 2016/0094787 | A1 | 3/2016 | Govil |
| 2016/0094814 | A1 | 3/2016 | Gousev |
| 2016/0094816 | A1 | 3/2016 | Carter |
| 2016/0105650 | A1 | 4/2016 | Carter |
| 2016/0360162 | A1 | 12/2016 | Carter |
| 2016/0360163 | A1 | 12/2016 | Carter |
| 2016/0366374 | A1 | 12/2016 | Carter |
| 2016/0366375 | A1 | 12/2016 | Carter |
| 2017/0048489 | A1 | 2/2017 | Carter |
| 2017/0048497 | A1 | 2/2017 | Carter |
| 2017/0078624 | A1 | 3/2017 | Carter |
| 2017/0078625 | A1 | 3/2017 | Carter |
| 2017/0085842 | A1 | 3/2017 | Carter |
| 2017/0353699 | A1 * | 12/2017 | Wang ............... G08B 13/19602 |
| 2018/0227507 | A1 * | 8/2018 | Siminoff .............. H04N 9/8227 |
| 2019/0149776 | A1 | 5/2019 | Carter |
| 2020/0007826 | A1 | 1/2020 | Carter |

OTHER PUBLICATIONS

AR0231AT 1/2.7-inch 23 Mp Digital Image Sensor, Advance Information, Semiconductor Components Industries, LLC, 2017, Publication Order Number: AR0231/3, Sep. 2017—Rev. P6.

ZL70550 Ultra-Low-Power Sub-GHz RF Transceiver, Microsemi Corporation, ZL70550-PP / 154044-4 / Jun. 17, 2017.

Stacey Higginbothamarchive Page; Qualcomm Wants Your Smartphone to Have Energy-Efficient Eyes; Mar. 29, 2017; https://www.technologyreview.com/2017/03/29/243161/qualcomm-wants-your-smartphone-to-have-energy-efficient-eyes/.

* cited by examiner

ACTIVITY SENSOR

BACKGROUND

Home and office security systems utilize technology for protection against unwanted entry into a building such as a home or business. The technology can include smart locks, alarm systems, lighting, motion detectors, camera systems and so on. A typical alarm system may include an alarm control panel, an activity sensor system, alerting devices, keypads, spotlights, cameras and lasers. A monitoring service is sometimes used to monitor and respond to alarms.

An activity sensor system may employ just a passive infrared (PIR) sensor. Alternatively, an activity sensor system may employ an image sensor that can capture motion images while detecting motion. An activity sensor system may also employ both an image sensor that can capture motion images while detecting motion and a PIR sensor. The image sensor, for example, is in a sleep mode until the PIR sensor senses motion and wakes up the image sensor to capture images.

DESCRIPTION OF THE EMBODIMENT

Figure 1:
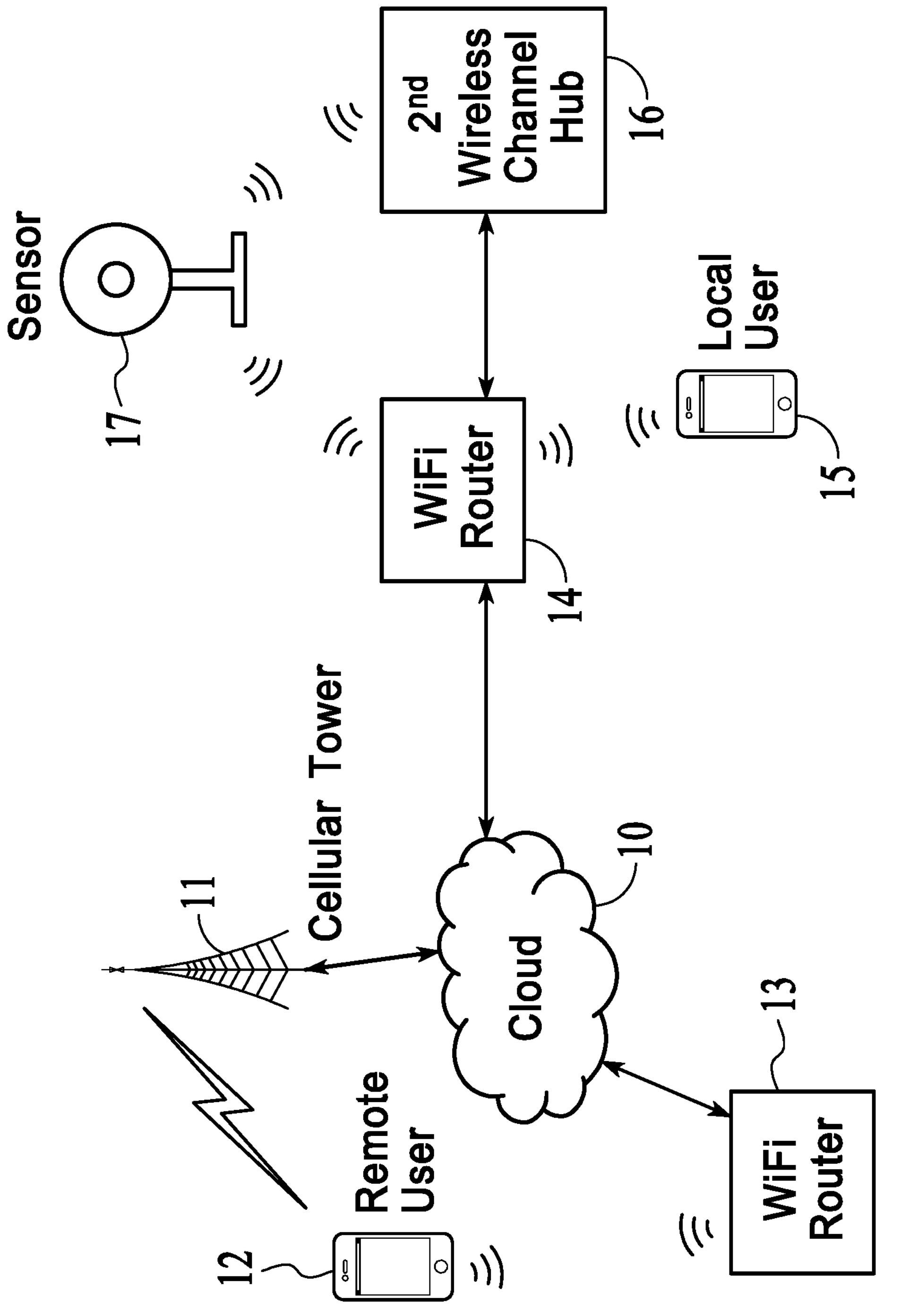
FIG. 1 shows a security system with a remotely programmable activity sensor system in accordance with an implementation.

FIG. 1 shows a security system with a remotely programmable activity sensor system 17. Remotely programmable activity sensor system 17 is in wireless contact, for example, with a Wi-Fi router 14 or another wireless communication device. Remotely programmable activity sensor system 17 also is in wireless contact with a second wireless channel hub 16, which provides a communication path for remotely programmable activity sensor system 17 to receive commands from a remote source and for remotely programmable activity sensor system 17 to provide status. Communication with remotely programmable activity sensor system 17 may be accomplished by a local user 15 directly through Wi-Fi router 14, or by a remote user 12 connected through the Internet, represented by cloud 10 a remote Wi-Fi router 13 to Wi-Fi router 14. Remote user 12 can be connected to cloud 10 via a cellphone network, represented by a cell tower 11, or by another type of wireless network, represented by a Wi-Fi router 13.

Figure 2:
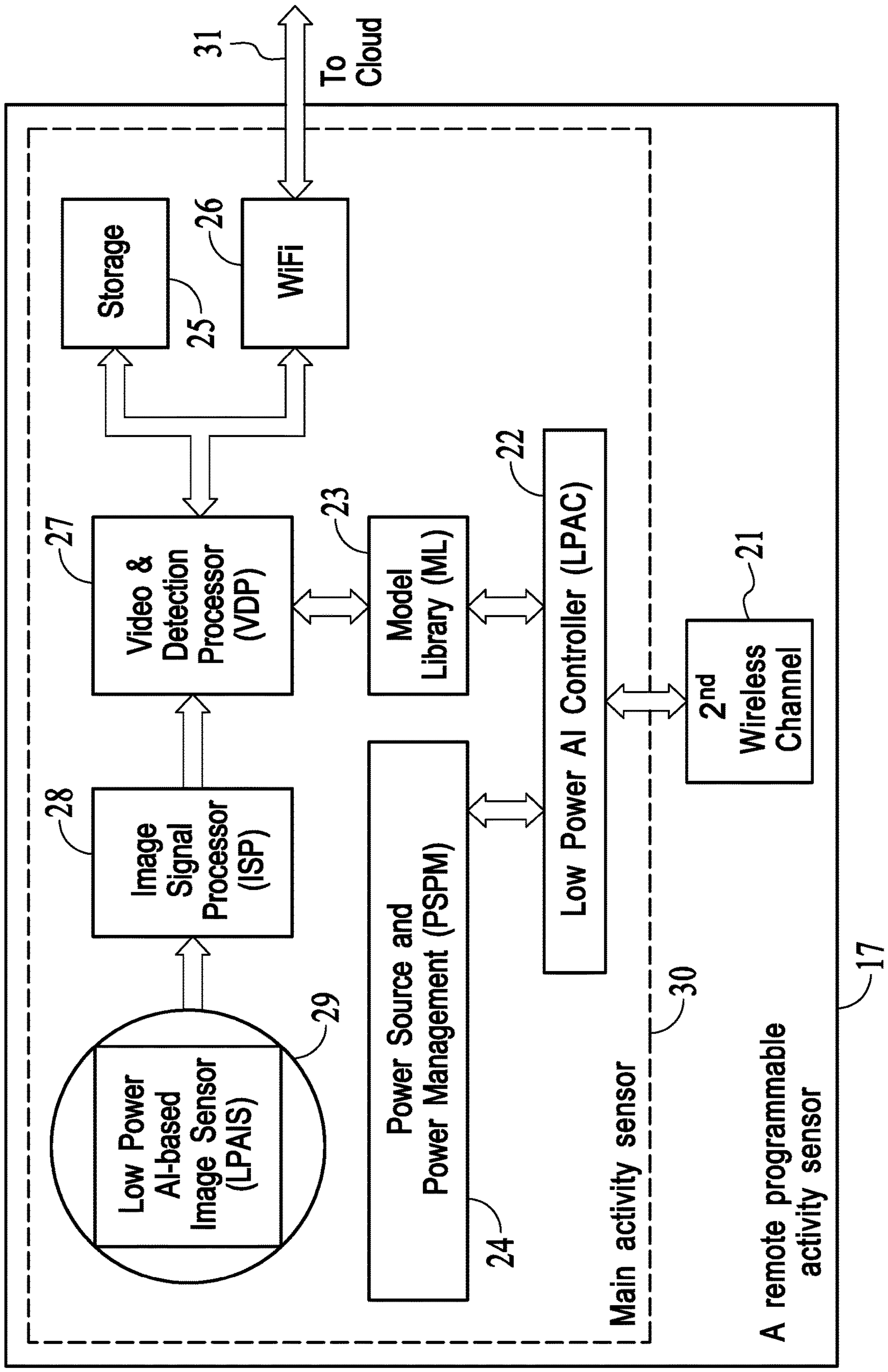
FIG. 2 shows a simplified block diagram of a remotely programmable activity sensor system in accordance with an implementation.

FIG. 2 shows a simplified block diagram of remotely programmable activity sensor system 17. A main activity sensor 30 includes a sensor 29 that is, for example, a low power artificial intelligence (AI) based image sensor. An image signal processor 28 processes signals captured by sensor 29. A video & detection processor 27 is used to process video and detect events and information from images in video signals received from image signal processor 28 and captured by sensor 29. Video from video & detection processor 27 may be stored in a local storage 25 and/or communicated through a Wi-Fi channel 26 to Wi-Fi channel hub 16 to a local user 15 or through cloud 10 to a remote user for storage or real-time viewing.

A low power AI controller 22 uses a wireless channel 21 to interface with second wireless channel hub 16. Low power AI controller 22 also controls a power source and power management block 24. Low power AI controller 22 receives data from the second wireless channel. When the data is a wakeup signal, low power AI controller 22 turns on power source and power management block 24. The main activity sensor 30 is then awakened into full operating mode. If the data is to select a new detection model, low power AI controller 22 will communicate with model library 23 to make the desired library model ready for video & detection processor 27 to check against when processing the captured video detection.

Wireless channel 21 can function as a built-in always-on low power consumption wireless communication channel. Sensor 29 can function as an always-on low power consumption AI-based image sensor. To save operating power, sensor 29 usually has lower image resolution; nevertheless, sensor 29 works well in detecting motional object. For example, using AI, sensor 29 can train itself to accurately detect certain specific object beside detecting the motion. Initial motion sensing is carried out by always-on sensor 29.

With sensor 29 being a low power artificial intelligence (AI) based image sensor, remotely programmable activity sensor system 17 can provide a highly reliable and accurate motion and object detection with very low power consumption. It provides an extremely low false detection rate.

Low power AI controller 22, accessible through second wireless channel 21, can be programmed for detection activity. This includes selecting a specific object for detection and storing image information for the specific object in model library 23. Thus, remotely programmable activity sensor system 17 can be programmed to send an alarm when a particular object is detected.

Second wireless channel 21 is implemented, for example, using a low bandwidth, low power consumption, long range wireless media and protocol—such as an independent sideband (ISB) band. The carrier frequency of second wireless channel 21 can be different from that of Wi-Fi. So, even if the Wi-Fi performance is degraded due to environment or other reason, the second wireless channel 21 can still be in proper operation mode.

Sensor 29 is typically always on using ultra low standby current consumption. However, if an even lower level of power consumption is desired, sensor 29 can be put in a sleep mode and an optional PIR sensor can be added to the circuit to detect motion and trigger sensor 29 to wake up for video capture.

For example, main activity sensor 17 is implemented using an ultra-low power CMOS image sensor with on-chip energy harvesting and power management capability, as is described by Ismail Cevik et al, "An Ultra-Low Power CMOS Image Sensor with On-Chip Energy Harvesting and Power Management Capability", Sensors 2015, 15, 5531-5554; doi:10.3390/s150305531, available at http:/www.mdpi.com/journal/sensors. The discussed 96×96 CMOS pixel array consumes 6.53 uW, with on-chip energy harvesting and power management capability that enables energy autonomous operation at 72.5% duty cycle imaging mode. Such low power image sensor due to its energy self-sufficiency can be operating always-on indefinitely under normal use environment.

In contrast, prevailing full-resolution image sensors such as the AR0231AT Digital Image Sensor by ON Semiconductor with 1928×1208 active-pixel array that consumes 350 mW Typical for battery powered systems are only awakened when active duty is called for. Otherwise, the image sensor is in sleep-mode to preserve battery life.

For example, wireless channel 21 is implemented using a low-power consumption wireless communication channel such as the ZL70050 Ultra-Low-Power Sub-GHz RF Transceiver by Microsemi, which utilizes 2.75 mA in transmit and 2.4 mA in receive, and has an ultralow sleep current of 10 nA. Such a low-power consumption wireless communication channel can support 5 mW power-consumption-level standby current with 100% readiness for receiving commands from a remote source. If the readiness duty-cycle is relaxed, for example with 0.2 second on-cycle with 1.8 second off-cycle (i.e. it is being placed in sleep-mode), then the average power consumption can be lowered to around 0.5 mW. This power-saving mode can still deliver a command response time (or latency) of near 2 sec, that may still be adequate for non-critical applications such as home-surveillance, while allowing longer battery operating time till next recharge.

The sensor system can capture fast-moving motion events without any lapses such as those caused by wake-up delays present in prior art, because the low power image sensor is always-on. The sensor system can distinguish the nature and category of the motion-triggering object, such as by a person, an animal, or a mechanical device, unlike in prior-art systems based on PIR (passive infrared) motion sensor. The main enabler for the low power image sensor's superiority over a PIR motion sensor is due to the fact that its 96×96 pixel array can capture object/event shapes with adequate resolution that allows object analysis to discern the images and determine the category of the motion-triggering object.

Since the low power wireless communication channel is either always-ON or periodically turned-on according to a preset duty cycle such as 0.2 seconds active to 1.8 seconds sleep, the sensor system can be commanded remotely any time, such as for acquiring real-time high-resolution images through awakening parts of the system that are typically idling in sleep-mode for conserving battery power, or for on-demand programming for intelligent and specific type(s) of object detection and recognition, among all other desirable commands.

Figure 3:
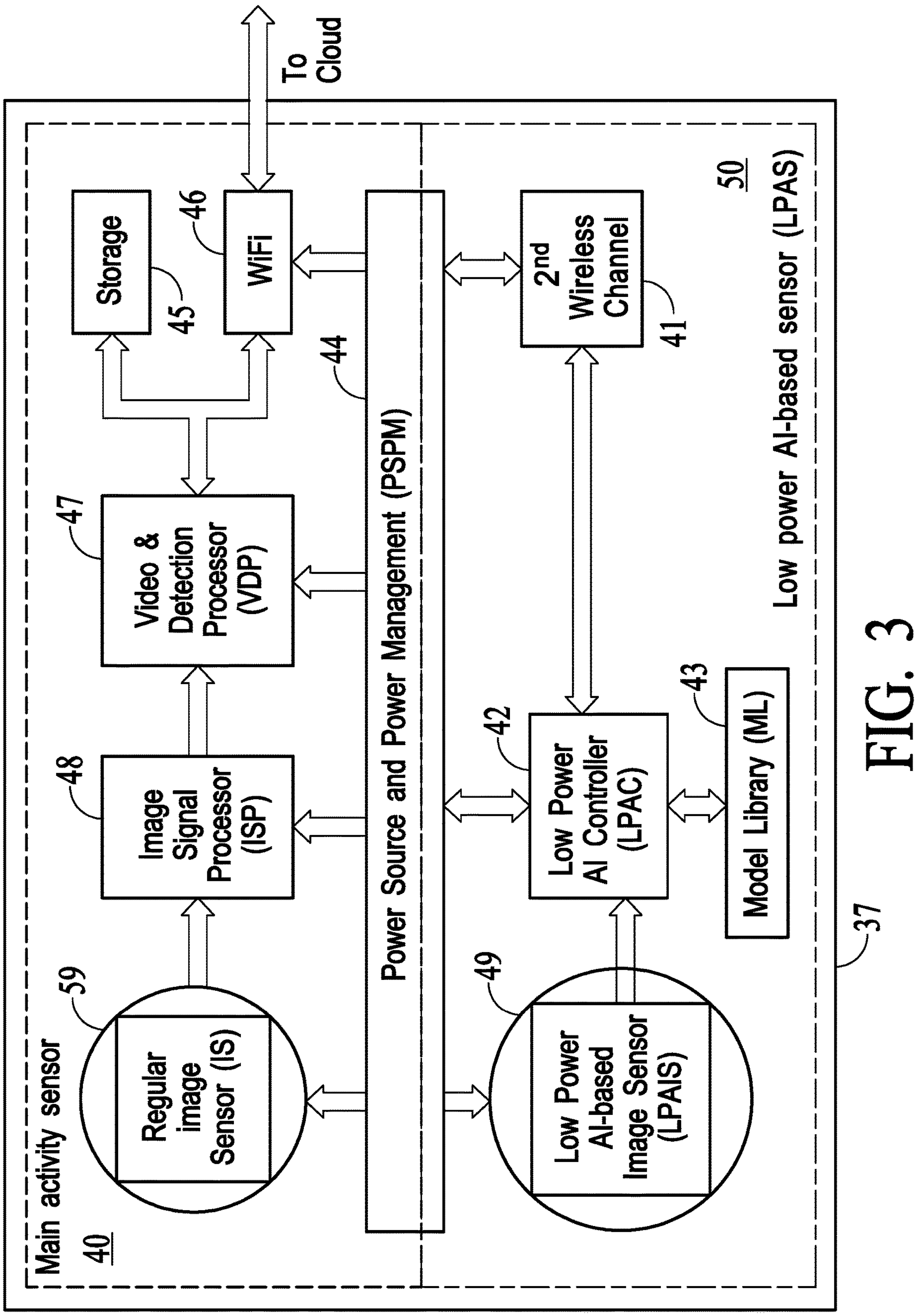
FIG. 3 shows another simplified block diagram of a remotely programmable activity sensor system in accordance with an implementation.

FIG. 3 shows a simplified block diagram of a remotely programmable activity sensor system 37 that is an alternative embodiment that may be used instead of remotely programmable activity sensor system 17. A main activity sensor 40 includes a high resolution sensor 59 that is, for example, a conventional high resolution image sensor. An image signal processor 48 processes signals captured by high resolution sensor 59. A video & detection processor 47 is used to process video and detect events and information from images in video signals received from image signal processor 48 as being captured by high resolution sensor 59. Video from video & detection processor 47 may be stored in a local storage 45 and/or communicated through a Wi-Fi channel 46 to Wi-Fi channel hub 16 to a local user 15 or through cloud 10 to a remote user for storage or real-time viewing.

A low power AI-based sensor 50 (LPAS) includes a low power image sensor 49 that is, for example, a low power artificial intelligence (AI) based image sensor (LPAIS). A low power AI controller 42 uses a wireless channel 41 to interface with second wireless channel hub 16. Low power AI controller 42 controls a power source and power management block 44. Low power AI controller 42 and video & detection processor 47 can access a model library 43.

Wireless channel 41 can function as a built-in always-on low power consumption wireless communication channel. Sensor 49 can function as an always-on low power consumption AI-based image sensor.

Second wireless channel 41 is implemented, for example, using a low bandwidth, low power consumption, long range wireless media and protocol—such as ISB band. The carrier frequency of second wireless channel 41 can be different from that of Wi-Fi. So, even if the Wi-Fi performance is degraded due to environment or other reason, the second wireless channel 41 can still be in proper operation mode.

To save operating power, low power image sensor 49 has lower image resolution than high resolution sensor 59; nevertheless, low power image sensor 49 works well in detecting a motional object. For example, using AI, low power image sensor 49 can train itself to accurately detect certain specific object beside detecting the motion. Initial motion sensing is carried out by the always-on low power image sensor 49.

With low power image sensor 49 being a low power artificial intelligence (AI) based image sensor, remotely programmable activity sensor system 37 can provide a highly reliable and accurate motion and object detection with very low power consumption. It provides an extremely low false detection rate.

Low power AI controller 42, accessible through second wireless channel 41, can be programmed for detection activity. This includes selecting a specific object for detection, image information of which is stored in model library 43. Thus, remotely programmable activity sensor system 37 can be programmed to send an alarm when a particular object is detected.

The high resolution sensor 59 has higher resolution and consumes more operating power than the low power image sensor 49. High resolution sensor 59 usually is in sleep mode when not in full operation. As soon as sensing a motional object, low power image sensor 49 sends a signal to wake up high resolution sensor 59 for high resolution sensing operation.

During sleep mode, a local or remote user can wake up the high resolution sensor 59 through second wireless communication channel 41.

For example, low power AI controller 42 is programmed for recognition of a specific object for detection, based on image information which is stored in model library 43. When low power image sensor 49 detects the presence of the specific object, this triggers high resolution sensor 59 to wake-up and begin capturing images. Until high resolution sensor is fully functional, low power image sensor 49 captures images, so that remotely programmable activity sensor system 37 is always recording events, whether in low resolution or in high resolution.

With low power image sensor 49, the remotely programmable activity sensor system 37 provides a highly reliable and accurate motion and object detection with very low power consumption. It provides an extremely low false detection rate.

For example, low power image sensor 49 is implemented using an ultra-low power CMOS image sensor with on-chip energy harvesting and power management capability, as is described by Ismail Cevik et al, "An Ultra-Low Power CMOS Image Sensor with On-Chip Energy Harvesting and Power Management Capability", Sensors 2015, 15, 5531-5554; doi:10.3390/s150305531, as cited above Similarly, high resolution sensor 59 is implemented using a full-resolution image sensor such as the AR0231AT Digital Image Sensor by ON Semiconductor with 1928×1208 active-pixel array, as described above.

For example, wireless channel 41 is implemented using a low-power consumption wireless communication channel such as the ZL70050 Ultra-Low-Power Sub-GHz RF Transceiver by Microsemi.

As described herein, a sensor system can capture fast-moving motion events without any lapses such as those caused by wake-up delays present in prior art, because the low power image sensor is always-on. The sensor system can distinguish the nature and category of the motion-triggering object, such as by a person, an animal, or a mechanical device.

Since the low power wireless communication channel is either always on or periodically turned-on according to a preset duty cycle such as 0.2 seconds active to 1.8 seconds sleep. The sensor system can be commanded remotely any time, such as for acquiring real-time high-resolution images through awakening parts of the system that are typically idling in sleep-mode for conserving battery power, or for on-demand programming of intelligent and specific type(s) of object detection and recognition, among all other desirable commands.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An activity sensor system, comprising:
- a library that stores image information;
- a first sensor that captures images from a first location at a first image resolution, the first sensor having access to the library that stores image information, the first sensor being able to recognize images based on the image information in the library;
- a second sensor that captures images from the first location at a second image resolution, where the second image resolution is higher than the first image resolution;
- a power management block that controls power to the second sensor; and
- a controller that manages the power management block;
- wherein in a sleep mode, the first sensor captures images, but the second sensor does not capture images; and
- wherein when in the sleep mode, the first sensor detects a predetermined image, the power management block supplies power to awaken the second sensor so that the second sensor captures images from the first location and is no longer in the sleep mode.

2. The activity sensor system as in claim 1, additionally comprising:
- a wireless channel connected to the controller through which a user can select a mode of operation for the activity sensor system and can select the predetermined image.

3. The activity sensor system as in claim 1, additionally comprising:
- a first wireless channel connected to the activity sensor system through which the images captured by the second sensor can be sent to a user; and
- a second wireless channel connected to the controller through which a user can select a mode of operation for the activity sensor system and can select the predetermined image.

4. The activity sensor system as in claim 1, additionally comprising:
- a first wireless channel connected to the activity sensor system through which the images captured by the second sensor and the images captured by the first sensor can be sent to a user; and
- a second wireless channel connected to the controller through which a user can select a mode of operation for the activity sensor system and can select the predetermined image.

5. The activity sensor system as in claim 1, additionally comprising:
- a first wireless channel connected to the activity sensor system through which the images captured by the second sensor can be sent to a device external to the activity sensor system; and
- a second wireless channel connected to the controller through which a user can select the device to which the images captured by the second sensor are sent.

6. An activity sensor system, comprising:
- a library that stores image information;
- a low power artificial intelligence based image sensor that captures images from a first location at a first image resolution, the low power artificial intelligence based image sensor having access to the library that stores image information, the low power artificial intelligence based image sensor being able to recognize images based on the image information in the library, the low power artificial intelligence based image sensor including a pixel array that consumes less than seven microwatts of power;
- a power management block that controls power to the low power artificial intelligence based image sensor; and
- a controller that manages the power management block;
- wherein when the low power artificial intelligence based image sensor detects a predetermined image, the activity sensor system notifies a user.

7. The activity sensor system as in claim 6, additionally comprising:
- a wireless channel connected to the controller through which a user can select a mode of operation for the activity sensor system and can select the predetermined image.

8. The activity sensor system as in claim 6, additionally comprising:
- a first wireless channel connected to the activity sensor system through which the images captured by the low power artificial intelligence based image sensor can be sent to a user; and
- a second wireless channel connected to the controller through which a user can select a mode of operation for the activity sensor system and can select the predetermined image.

9. The activity sensor system as in claim 6, additionally comprising:
- a first wireless channel connected to the activity sensor system through which the images captured by the low power artificial intelligence based image sensor can be sent to a device external to the activity sensor system; and
- a second wireless channel connected to the controller through which a user can select the device to which the images captured by the low power artificial intelligence based image sensor are sent.

10. The activity sensor system as in claim 6, additionally comprising:
- a passive infrared detector;

wherein in a sleep mode, the low power artificial intelligence based image sensor does not capture images; and wherein when in the sleep mode, the passive infrared detector detects motion, the power management block supplies power to awaken the low power artificial intelligence based image sensor so that the low power artificial intelligence based image sensor captures images from the first location and is no longer in the sleep mode.

11. An activity sensor system, comprising:

a library that stores image information;

a first sensor that captures images from a first location at a first image resolution, the first sensor having access to the library that stores image information, the first sensor being able to recognize images based on the image information in the library;

a second sensor that captures images from the first location at a second image resolution, where the second image resolution is higher than the first image resolution;

a power management block that controls power to the second sensor; and a controller that manages the power management block;

wherein in a sleep mode, the first sensor captures images, but the second sensor does not capture images; and wherein when in the sleep mode, the first sensor detects motion, the power management block supplies power to awaken the second sensor so that the second sensor captures images from the first location and is no longer in the sleep mode.

12. The activity sensor system as in claim 11, additionally comprising:

a wireless channel connected to the controller through which a user can select a mode of operation for the activity sensor system.

13. The activity sensor system as in claim 11, additionally comprising:

a first wireless channel connected to the activity sensor system through which the images captured by the second sensor can be sent to a user; and a second wireless channel connected to the controller through which a user can select a mode of operation for the activity sensor system.

14. The activity sensor system as in claim 11, additionally comprising:

a first wireless channel connected to the activity sensor system through which the images captured by the second sensor and the images captured by the first sensor can be sent to a user; and a second wireless channel connected to the controller through which a user can select a mode of operation for the activity sensor system.

15. The activity sensor system as in claim 11, additionally comprising:

a first wireless channel connected to the activity sensor system through which the images captured by the second sensor can be sent to a device external to the activity sensor system; and a second wireless channel connected to the controller through which a user can select the device to which the images captured by the second sensor are sent.

* * * * *